United States Patent [19]

Chapman

[11] Patent Number: 4,989,737
[45] Date of Patent: Feb. 5, 1991

[54] RELATING TO RACKING SYSTEMS

[75] Inventor: Leslie J. Chapman, Alresford, United Kingdom

[73] Assignee: Keith Hancock Structures Ltd., Alton, United Kingdom

[21] Appl. No.: 453,694

[22] Filed: Dec. 20, 1989

[51] Int. Cl.⁵ .............................................. A47F 5/00
[52] U.S. Cl. ...................................... 211/193; 52/36; 211/208
[58] Field of Search ............... 211/207, 208, 189, 190, 211/193, 191, 182, 183, 186, 187; 52/36

[56] References Cited

U.S. PATENT DOCUMENTS

| | | | |
|---|---|---|---|
| 3,305,981 | 2/1967 | Biggs et al. | 52/36 |
| 3,356,328 | 12/1967 | Sachau | 248/245 |
| 3,363,340 | 1/1968 | McKinley | 211/182 X |
| 3,388,809 | 6/1968 | Irish | 211/191 X |
| 3,407,547 | 10/1968 | Doke et al. | 52/36 |
| 3,562,970 | 2/1971 | Schwartz | 52/36 |
| 4,839,999 | 6/1989 | Clemens et al. | 52/36 |

FOREIGN PATENT DOCUMENTS 739425  10/1955  United Kingdom ............... 211/183

Primary Examiner—Robert W. Gibson, Jr.
Attorney, Agent, or Firm—Florence U. Reynolds

[57] ABSTRACT

A cantilever racking system comprises vertical pillars formed of two metal sections of steel strip rolled to a cross-section comprising a central web portion bounded by two channel portions. The web portions are secured in facing relationship so that the juxtaposed channel portions form T-shaped slots having inturned marginal edges. Cantilever arms may be clamped in place against the end surfaces defined by channel portions for example by bolts engaging captive nuts engaging with the inturned edges of the metal strips.

4 Claims, 2 Drawing Sheets

RELATING TO RACKING SYSTEMS

BACKGROUND OF THE INVENTION

This invention concerns improvements in racking systems, and more especially to cantilever type racking systems comprising a structure formed by a frame-work of metal support members.

A variety of such systems are known, which generally comprise upright pillars of rolled steel or extruded metal sections, from which are hung horizontally extending cantilever arms arranged to support a load stored thereon, either directly or via shelving.

The cantilever arms are generally required to be vertically adjustable to enable adaption of the system to storage requirements, whilst being secure against vertical movement in use. Hitherto known structures devised to meet these needs have, however, suffered from attendant disadvantages, including relatively uneconomic use of metal in the load bearing supports, and complicated fastening systems that are expensive to produce and/or unsightly.

Furthermore, hitherto known racking systems adapted for the support of relatively heavy loads do not lend themselves to assembly within an aesthetically pleasing structure, such as may be required in establishments wherein goods are displayed upon racking systems at the point of sale. In such systems it may, for example, be required that the structural frame-work of the system be enclosed within decorative panelling serving to partition the establishment and from opposite surfaces of which the racking system is to extend.

SUMMARY OF THE INVENTION

It is an object of the present invention to provide a racking system that avoids, or at least reduces, at least one of the above-mentioned disadvantages.

The invention provides a cantilever racking system comprising an arrangement of vertically extending pillars located in a common vertical plane, from which pillars are to be supported cantilever arms extending on both sides of said vertical plane, wherein each pillar comprises an assembly of two metal sections secured together and meeting at an intermediate vertical plane extending at right angles to said common vertical plane, each section comprising a central web portion extending parallel to said intermediate plane and two channel portions bounding said web portion, and said two sections respectively being symmetrical about said intermediate vertical plane whereby the juxtaposed channel portions thereof form on each side of said common vertical plane T-slots opening away therefrom and adapted to receive fastening means for clamping cantilever arms to said pillar.

Preferably each metal section is a rolled steel section of which the free margins are shaped to form inturned rims bounding the openings to said T-slots. Such an arrangement provides a simply and economically formed structure of which the load bearing characteristics are relatively high in relation to the cost of production.

Advantageously the free edges of each rolled steel section are serrated whereby said inturned rims terminate in a vertically toothed edge. Such toothed edges enable secure fastening of cantilever arms against impact loading in a vertical direction, whilst being relatively easy to form during the manufacture of the rolled steel section.

In a preferred embodiment of the invention horizontally extending bracing beams are arranged between adjacent pillars of said system, said beams being secured end to end by fastening means passing through and securing together abutting central web portions of the sections of each pillar. Such an arrangement enables a stable structure to be formed with economical use of fastening means and corresponding reduction of assembly time. Such an arrangement further lends itself to the fabrication of an aesthetically pleasing structure wherein said horizontally extending bracing beams are enclosed between vertically extending partition panels of which the vertical margins are engaged and located within gaps defined between said bracing beams and opposing surfaces of the channel portions of said metal sections.

Further preferred features and advantages of the present invention will become apparent from the following description of a preferred embodiment of the invention taken in conjunction with the accompanying drawings and any accompanying claims.

DETAILED DESCRIPTION OF THE PREFERRED EMBODIMENT

Figure 1:
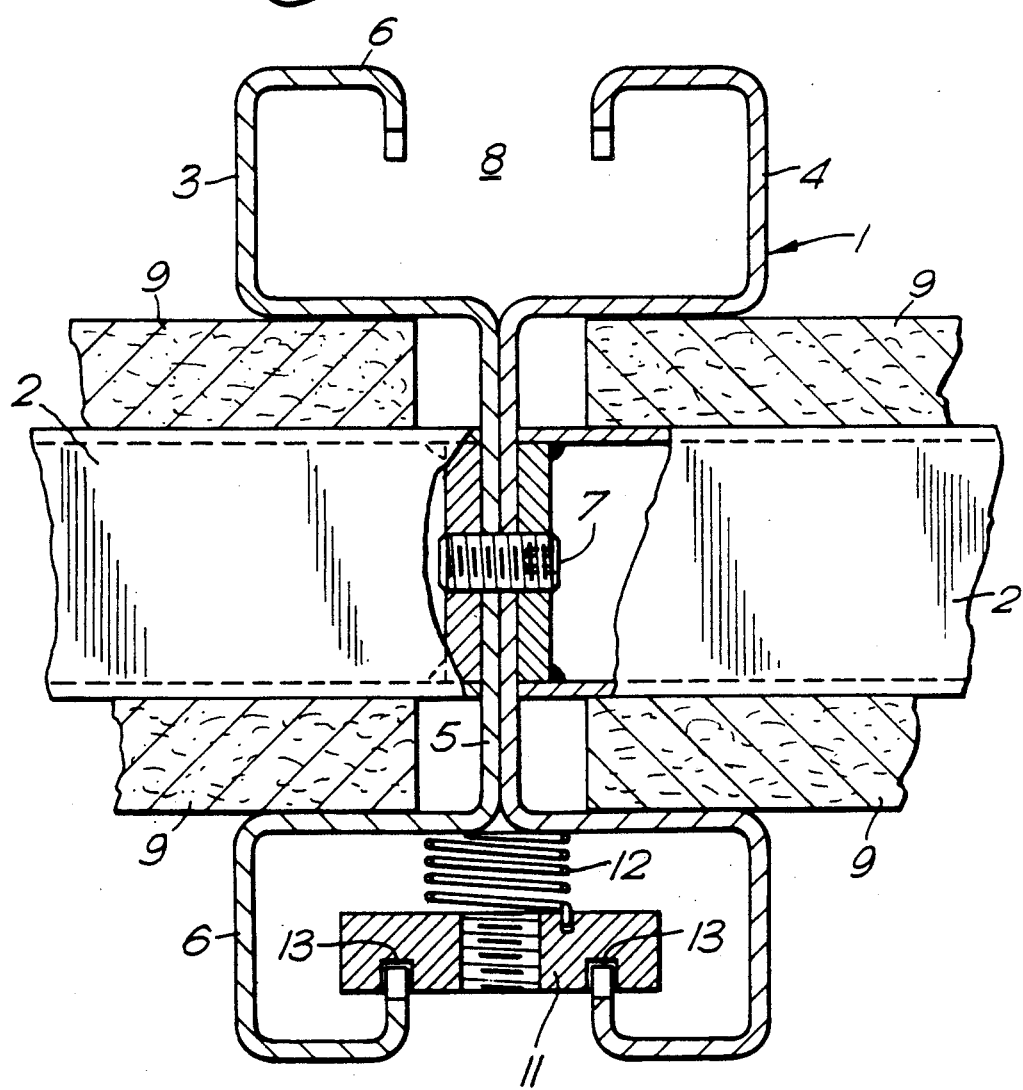
FIG. 1 is a horizontal cross-section of a detail of the frame-work of a cantilever racking system in accordance with the invention shown without the attachment of cantilever arms.

Referring to FIG. 1, one embodiment of racking system in accordance with the invention comprises a plurality of upstanding vertical pillars 1 stably supported in relation to the ground by any suitable means conventional to such racking systems. The vertical pillars 1 are horizontally spaced with reference to a common vertical plane by means of bracing beams 2 arranged end to end between the vertical pillars 1.

Each vertical pillar 1 is formed of two identical metal sections 3 and 4 of steel strip rolled to the cross-section illustrated in the drawing. Thus each section comprises a central web portion 5 bounded by two channel portions 6.

The web portions 5 of the two metal sections 3 and 4 are secured in facing relationship by fastening means indicated diagrammatically at 7, which also serve to secure the bracing beams 2 end to end. The channel portions 6 of the two juxtaposed sections 3 and 4 thereby form T-shaped slots 8 the openings of which are reinforced by the inturned free marginal edges of the rolled metal strips. Conveniently the free edges of the metal strips are serrated during the rolling process, and thus the corresponding inturned edges present vertically extending rows of teeth.

The bracing beams 2 are formed of U-shaped rolled steel section of which the ends are closed by metal plates welded thereto and arranged to receive the fastening means 7. The vertically extending limbs of the U-shaped channel serve to form abutment surfaces for vertically arranged partition panels 9 that are retained in place against the bracing beam 2 by engagement in a gap between the beam and the adjacent channel portion 6 of the pillar 1.

Figure 2:
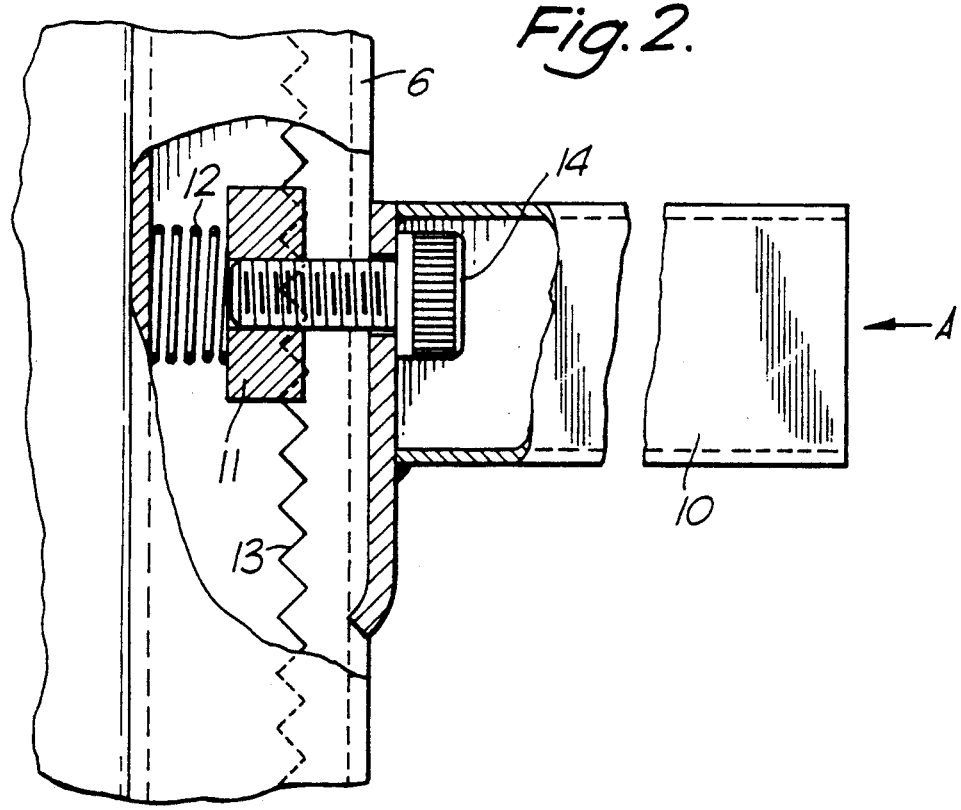
FIG. 2 is a fragmentary side sectional elevation illustrating the attachment of a cantilever arm to the structure of FIG. 1.
Figure 3:
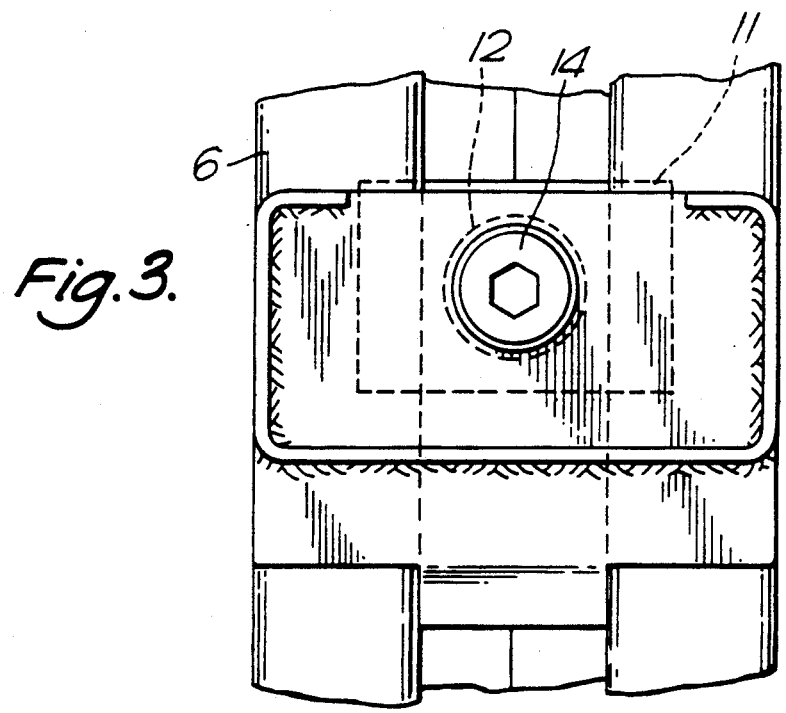
FIG. 3 is a front sectional elevation corresponding to FIG. 2 and taken in the direction of the arrow A of FIG. 2.

Cantilever arms 10 may be clamped in place against the surfaces presented by the channel portions 6, as shown in FIGS. 2 and 3. Securing of the cantilever arms in place may be effected by insertion into the T-slot of a clamping means arranged to engage against the serrated edges of the metal sections.

For example, a captive nut 11 and an associated compression spring 12 may be introduced into the T-slot with a narrower dimension of the nut 11 aligned with the mouth of the slot, whereupon the nut 11 is turned through 90° until serrated grooves 13 thereof engage with the correspondingly serrated edges at the mouth of the slot. The compression spring 12 thereupon retains the nut in place whilst allowing manual adjustment of the vertical position of the nut 11 prior to securing of the cantilever arm. As shown in more detail in FIGS. 2 and 3 the cantilever arm may be clamped in place by engagement of a fastening screw 14 with the screw threads of a fastening screw 14 with the screw threads of the captive nut 11.

Alternatively any other desired form of clamping arrangement may be utilized, for example by replacing the captive nut 11 with a T-bolt of which the shank extends from the T-slot for engagement by suitable fastening means associated with the cantilever arm 10.

It will be appreciated from the above description that the arrangement in accordance with the described embodiment of the invention provides a simply and economically constructed cantilever racking system that can be incorporated in a partitioning structure in an unobtrusive and aesthetically appealing manner whilst providing adequate load-bearing characteristics.

What is claimed is:

1. A cantilever racking system comprising an arrangement oaf vertically extending pillars located in a common vertical plane, from which pillars are supported, cantilever arms extending on both sides of said vertical plane, wherein each pillar comprises an assembly of two rolled steel sections secured together and meeting at an intermediate vertical plane extending at right angles to said common vertical plane, each section comprising a central web portion extending parallel to said intermediate plane and two channel portions bounding said web portion, each said channel portion comprising a first side wall portion extending from said web portion substantially at right angles thereto, a base portion extending from said first side wall portion in a direction away from and substantially parallel to said web portion, a second side wall portion extending from said base portion in a direction substantially parallel to said first side wall portion and an inturned rim portion extending from said second side wall portion and terminating in a free edge spaced from the first side wall portion, said two sections respectively being symmetrical about said intermediate vertical plane whereby the juxtaposed channel portions thereof form on each side of said common vertical plane T-slots opening away therefrom with said inturned rims bounding the openings to said T-slots, and each cantilever arm being secured in place by clamping means which, on the one hand, engage against the external faces of the second side wall portions of said juxtaposed channel portions and on the other hand are located within said T-slots and engage against the free edges of the said inturned rims, said clamping means being releasable for vertical adjustment of the positions of said cantilever arms.

2. A racking system according to claim 1, wherein the free edges of each rolled steel section are serrated whereby said inturned rims terminate in a vertically toothed edge for engagement by a correspondingly toothed element of said clamping means.

3. A racking system according to claim 1, wherein horizontally extending bracing beams are arranged between adjacent pillars of said system, said beams being secured end to end by fastening means passing through and securing together abutting central web portions of the sections of each pillar.

4. A racking system according to claim 3, wherein said horizontally extending bracing beams are enclosed between vertically extending partition panels of which the vertical margins are engaged and located within gaps defined between said bracing beams and opposing surfaces of the channel portions of said metal sections.

* * * * *